United States Patent [19]
Yates

[11] Patent Number: 4,479,858
[45] Date of Patent: Oct. 30, 1984

[54] PHOTOACTIVATED CATALYTIC POLYMERIZATION OF MONOEPOXIDES

[75] Inventor: Ronald L. Yates, Midland, Mich.

[73] Assignee: The Dow Chemical Company, Midland, Mich.

[21] Appl. No.: 390,437

[22] Filed: Jun. 21, 1982

[51] Int. Cl.[3] .................... B01J 19/12
[52] U.S. Cl. .................... 204/158 R
[58] Field of Search .................... 204/158 R, 158 L

[56] References Cited

U.S. PATENT DOCUMENTS

| | | | |
|---|---|---|---|
| 3,714,006 | 1/1973 | Anderson | 204/159.14 |
| 4,048,110 | 9/1977 | Vanderspurt | 502/161 |
| 4,068,063 | 1/1978 | Ikeda et al. | 526/97 |
| 4,089,881 | 5/1978 | Lukehart | 260/429 R |
| 4,111,856 | 9/1978 | Haag et al. | 521/30 |
| 4,298,439 | 11/1981 | Gafney | 204/158 R |

FOREIGN PATENT DOCUMENTS 1202503 5/1966 Fed. Rep. of Germany .

OTHER PUBLICATIONS

J. V. Crivello and J. H. W. Lam, *Macromolecules,* v. 10, No. 6, pp. 1307–1315 (1977).
*Z. Naturforschg.,* B, 21 (10) 997–998 (1966).
*Z. Naturforschg.,* B, 20 513–516 (1965).
C. H. Bamford et al., *Chemical Communications,* pp. 469–470 (1965).

*Primary Examiner*—Howard S. Williams
*Attorney, Agent, or Firm*—Paul D. Hayhurst

[57] ABSTRACT

A process to form polyethers from monoepoxides in the presence of a catalyst, said catalyst being formed from a photoactivated rhenium carbonyl coordination compound precursor.

14 Claims, No Drawings

PHOTOACTIVATED CATALYTIC POLYMERIZATION OF MONOEPOXIDES

BACKGROUND OF THE INVENTION

This invention relates to an improved catalytic process for preparing polyethers. In particular, the invention relates to a process for preparing polyethers by photoactivated catalysis of monoepoxide compounds generally under mild conditions. The invention further relates to novel compositions made by the process.

It is known to produce polyethers from alkylene oxides in the presence of catalysts. Such a process which utilizes a thermally of ultraviolet light activated metal carbonyl catalyst, particularly $Mn_2(CO)_{10}$, to produce solid polyethers having high molecular weights is dislosed in West German Pat. No. 1,202,503. Additionally, diaryliodonium salts are known to be photoinitiators for cationic polymerization. See J. V. Crivello and J. H. W. Lam, Macromolecules, Vol. 10, No. 6, pp. 1307-1315 (1977). Aryldiazonium compounds are also known to aid the photopolymerization of epoxy monomers. See, e.g., U.S. Pat. No. 3,708,296.

SUMMARY OF THE INVENTION

According to the present invention, the process comprising polymerizing an alkylene oxide or mixture of alkylene oxides under reaction conditions to form a polyether having a weight average molecular weight of from about 2,000 to about 30,000 is improved by utilizing at least one of several catalysts. The process of the instant invention incorporates a transition metal carbonyl coordination compound precursor. This precursor upon exposure to electromagnetic radiation decomposes to a plurality of species including at least one species hereinafter termed "photoactivated" that is catalytically active with respect to the above reaction. Therefore, the reaction can be controlled by the presence or absence of radiation to produce a catalytic amount of photoactivated species. Subsequent to irradiation, the reaction will proceed even after removal of the radiation source. How long the reaction proceeds after this removal generally depends on the length of exposure to radiation as well as the particular catalyst precursor. Elevated temperatures are unnecessary to promote this reaction. Therefore, in one aspect, this invention provides a process which allows flexibility in operation as to process reaction conditions and catalyst choice.

Another aspect of this invention is the discovery of novel compounds which may be prepared by the method of the present invention. The products produced by the present invention are useful, among other things, as thickeners and lubricants.

DETAILED DESCRIPTION OF THE INVENTION

The invention employs as a monomer a monoepoxide or mixtures thereof. Any monoepoxide which has a utilizable radiation absorption band which does not substantially overlap that of the catalyst should be suitable. While the instant invention can be carried out with some overlap, it is critical that the catalyst precursor absorb enough radiation to produce the catalytically active species in sufficient quantity to promote the reaction. If the absorption bands of the catalyst and a reactant overlap, then the possibility exists that the reactant will absorb enough radiation to inhibit the formation of the desired catalytically active species. This possibility is greatly enhanced by the relatively large concentration of reactant compared to the concentration of catalyst precursor. Therefore, no overlap is to be preferred while some overlap is tolerable. Suitable monoepoxides include lower molecular weight monoepoxides such as ethylene oxide, propylene oxide, butylene oxide, isobutylene oxide, styrene oxide, allyl glycidyl ether, epibromohydrin and epichlorohydrin. Propylene oxide and butylene oxide are examples of preferred monoepoxides.

Suitable catalyst precursors for the process of this invention are rhenium carbonyl coordination compounds. Preferred is dirhenium decacarbonyl [$Re_2(CO)_{10}$].

A catalytic amount of photoactivated species of a transition metal carbonyl coordination compound precursor is required for the practice of this invention. This necessitates the inclusion of a sufficient amount of the precursor to allow formation of the required activated species. Typically, the catalyst precursor is present at a minimum precursor:monomer weight ratio of about 1:1000 and preferably of about 1:700. These ratios are typical with the actual ratios determined by the specific catalyst and monomer used as well as practical considerations such as convenience and economy.

Any radiation source is suitable which produces a catalyst comprising at least one photoactivated species of a rhenium carbonyl coordination compound precursor. The preferred electromagnetic radiation is that having wavelengths within a range from about 200 nanometers to about 850 nanometers (hereinafter termed "ultraviolet" range) (Note this range as defined here is broader than the typical UV range and encompasses the visible range and beyond up to about 850 nanometers). It is not necessary that the radiation source cover the entire range, only that some radiation be emitted that has a wavelength falling within this range. The wavelength of choice may vary depending upon the particular reactants and catalyst precursor used in the reaction. Examples of devices comprising suitable radiation sources include low, medium or high pressure mercury or xenon arc lamps and monochromatic lasers.

Without wishing to be bound by any specific theory, it is believed that coordinatively unsaturated metal complexes are the reactive species which catalyze the process reaction. Coordinatively unsaturated metal complexes are considered molecular fragments of organometallic complexes. These fragments are conveniently produced by irradiation of the complexes. Well-known examples of this production are:

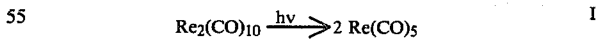

$$Re_2(CO)_{10} \xrightarrow{hv} 2\ Re(CO)_5 \qquad \text{I}$$

$$Cr(CO)_6 \xrightarrow{hv} [Cr(CO)_5] + CO.$$

The coordinatively unsaturated species [$Re(CO)_5$] is produced by the photoinduced cleavage of a metal-metal bond. The coordinatively unsaturated species [$Cr(CO)_5$] is produced by the photoinduced expulsion of a labile ligand, viz. CO. These coordinatively unsaturated complexes are extremely reactive and undergo further reactions. For example, $Re(CO)_5$, which can be photogenerated from $Re_2(CO)_{10}$, reacts readily with $CCl_4$ to form a complex:

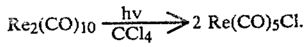

$$Re_2(CO)_{10} \xrightarrow[CCl_4]{hv} 2\ Re(CO)_5Cl. \quad \text{II}$$

The reactions in I with subsequent production of coordinatively unsaturated species may be generalized by the following reactions wherein $h\nu$=ultraviolet radiation, M=transition metal, L=ligand or organometallic fragment, and x is a positive integer.

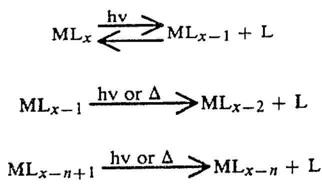

$$ML_x \underset{}{\overset{hv}{\rightleftharpoons}} ML_{x-1} + L \quad \text{III}$$

$$ML_{x-1} \xrightarrow{hv \text{ or } \Delta} ML_{x-2} + L \quad \text{IV}$$

$$ML_{x-n+1} \xrightarrow{hv \text{ or } \Delta} ML_{x-n} + L \quad \text{V}$$

Reaction III is photoinitiated; however, reactions IV–V can either be photoinitiated or thermally initiated. In either case, the species produced $ML_{x-2}$—$ML_{x-n}$ result from an initial absorption of radiation by $ML_x$. In the instant invention, the catalytically active species may be formed in the primary step III or may result from either photo or thermal decomposition of an intermediate, e.g., $ML_{x-1}$, to an eventual catalyst $ML_{x-n}$ in subsequent steps. It should be noted that light is required only to initiate the formation of a ground state catalytic species. Therefore, if a catalyst is being formed via step III or subsequent decomposition steps, its activity should continue after the initial period of irradiation stops. Table I contains data showing this continued activity.

TABLE I

Photogeneration of Thermal Catalysts for Polymerization of Propylene Oxide using $Re_2(CO)_{10}$

| Run # | Time of Irradiation | Subsequent Dark Period | Product Inherent Viscosity | % Conversion of Propylene Oxide |
|---|---|---|---|---|
| 1 | 35 min | 20 hours | 0.19 | 61 |
| 2 | 35 min | 20 hours | 0.17 | 80 |
| 3 | 35 min | none | | 22 |

The data in Table I was obtained using the apparatus and procedure of Example 1 as hereinafter described. However, in Runs 1 and 2, the reaction mixture was allowed to stand in the dark for the indicated time. The percentage yields were determined by the removal of unreacted propylene oxide under reduced pressure. Comparison of Runs 1 and 2, in which the reaction was allowed to proceed at ambient temperature in darkness after 35 minutes of irradiation at 350 nanometers at 29° C., with Run 3 reveals that a catalytically active ground state species had been formed by photolysis of $Re_2(CO)_{10}$.

It is to be noted that the process of the invention may be advantageously carried out in batch, semi-batch or continuous reactors.

The temperature at which the reaction is carried out may vary from below to above ambient temperatures with temperatures from 0° C. to 50° C. being common. Preferably, the reaction temperature is from about 20° C. to about 50° C. Most preferably, the reaction is carried out at a temperature of from about 20° C. to about 30° C.

The reaction may also proceed under elevated or depressed as well as atmospheric pressures. However, it is to be noted that the reaction should not be carried out in an open vessel since the reaction mixture will generally have been degassed to remove dissolved oxygen which poisons the catalyst. Degassing may be accomplished in various ways known to those skilled in the art. Two common methods are purging with nitrogen or subjecting the reaction vessel and its contents to repetitive freeze-pump-thaw cycles. Utilizing either method will allow the reaction to be carried out in an inert environment thereby preserving the catalyst and avoiding unwanted side reactions.

The method of the present invention can be used to produce polymers having a wide variety of molecular weights simply by changing the reaction conditions such as, for example, irradiation time and intensity, catalyst precursor, homogeneous or heterogeneous catalyst, type of irradiation, and the combination of irradiation time and dark time. The time of irradiation will generally be based upon practical considerations such as convenience, economy, catalyst choice, and product molecular weight desired, as well as the particular monomers used. The effects of altering various process conditions can be discerned from studying the examples.

The process of the invention can produce high yields of polyether products. However, care should be used to avoid the presence of water in the reaction as $H_2O$ deactivates the catalyst.

The catalyst precursors of the present invention may be immobilized on solid supports or may be employed homogeneously. When employed homogeneously, the catalytic entity preferably is removed from the polymeric reaction product after the desired reaction is completed. This removal obviates product degradation which might result if the catalytic entity were not removed. Polymeric resins which are coordinating towards metals, e.g., weak to strongly basic ion-exchange resins, may be used to separate degradation-inducing catalysts from the polymeric reaction products.

The use of a supported catalyst percursor simplifies removal of catalyst from the reaction products, and for practical purposes has the advantage of eliminating a separate step for catalyst removal. However, products produced by a reaction which is catalyzed by a supported catalyst fall within a narrower molecular weight range than do the products of homogeneously catalyzed reactions. Typically, products of reactions wherein the catalyst is a "supported catalyst" have weight average molecular weights of from about 2,000 to about 3,000, versus a range of from about 2,000 to about 30,000 for products of homogeneously catalyzed reactions. Thus, some products of reaction wherein the catalyst is supported have molecular weights which are capable of being produced by the cationic polymerization methods of the prior art. It should be noted that the higher molecular weight products, e.g., those having weight average molecular weights greater than about 10,000, of the present invention are not known to be producible via cationic polymerization. Therefore, the polyethers of the present invention having weight average molecular weights of from about 10,000 to about 30,000 and higher are preferred and are believed to be novel compositions. The preferred weight average molecular weight range corresponds to an inherent viscosity range of from about 0.10 to about 0.20.

Typically, the supported catalyst is prepared by soaking under an inert atmosphere a dried supporting agent in a solution which contains the catalyst precursor. After the desired soaking period is completed, the supporting agent is dried. The supporting agent then is ready for photoactivation.

Porous glass is a suitable supporting agent. Thirsty glass porous glass is an example of a preferred supporting agent. For a reference to thirsty glass as a supporting agent see U.S. Pat. No. 4,298,439 and the references therein; said patent and references are incorporated herein by reference. Preferably, the supporting agent is transparent to radiation in the ultraviolet range.

SPECIFIC EMBODIMENTS

The following examples are given to illustrate the process of the invention, but these examples should not be taken as limiting the scope. Inherent viscosities were determined with an Ostwald viscometer using the equation $\eta_{inh}=(\ln(T/T_o))/[c]$ wherein $T_o$ is the flow time of $CH_2Cl_2$, T is the flow time of a dilute solution of polymer in $CH_2Cl_2$ and [c] is the concentration of polymer in g/dl.

EXAMPLE 1

Propylene oxide is distilled under $N_2$ and is kept dry over molecular sieve absorbents.

The reaction vessel is a Pyrex tube equipped with a high vacuum stopcock and a Teflon® plug. To the reaction vessel is added 2.49 g (3 ml, 0.043 moles) of propylene oxide and 0.0025 g of catalyst. The reaction mixture is degassed thoroughly by 3 freeze-pump-thaw cycles. The evacuated reaction vessel is then placed in a Rayonet photoreactor which is equipped with 18 RPR brand 3500 A lamps whose spectral output is a maximum at 350 nanometers. The operating temperature of the reactor is 29° C.

The reaction mixture is then irradiated for 20 hours after which unreacted propylene oxide is removed in vacuo. The percent propylene oxide (percent PO) conversion is calculated using the expression:

$$\%\ PO\ \text{Conversion} = \left(\frac{(PO)_O - (PO)_T}{(PO)_O}\right) \times 100$$

where $(PO)_O$ is the initial weight (grams) of propylene oxide and $(PO)_T$ is the weight (grams) of unreacted propylene oxide at time T. The results for a variety of transition metal carbonyl complexes are shown in Table II. Runs 2 through 13 are comparison runs not exemplary of this invention.

TABLE II

Photoactivated Catalyzed Polymerization of Propylene Oxide

| Run # | Catalyst | % Propylene Oxide Conversion[a] |
|---|---|---|
| 1 | $Re_2(CO)_{10}$ | 93 |
| 2 | $Ru_3(CO)_{12}$ | 11 |
| 3 | $Ir_4(CO)_{12}$ | 4 |
| 4 | $Os_3(CO)_{12}$ | 8 |
| 5 | $Fe_3(CO)_{12}$ | <1 |
| 6 | $Mn_2(CO)_{10}$ | 0[a,b] |
| 7 | $Co_2(CO)_6(PPh_3)_2$ | 4 |
| 8 | $Co_2(CO)_8$ | 5 |
| 9 | $Rh_6(CO)_{16}$ | 20 |
| 10 | $RhCl(CO)(PPh_3)_2$ | 0 |
| 11 | $Mo(CO)_6$ | 0 |
| 12 | $W(CO)_6$ | <1 |
| 13 | $Cr(CO)_6$ | 0 |

[a]Irradiation time = 20 hours
[b]Irradiation time = 40 hours

In Example 1, the product was identified by infrared spectroscopy, nuclear magnetic resonance, and inherent viscosity measurement to be a polyether formed according to the following:

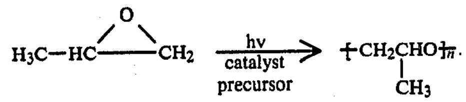

As can be seen from Table II, the most effective catalyst prescursor is the carbonyl compound of rhenium (Re). Interestingly, $Mn_2(CO)_{10}$, which is known to be a somewhat effective photoactivated catalyst precursor at higher temperatures, is found to be a poor choice for the lower temperature employed in Example 1, even after 40 hours of irradiation.

EXAMPLE 2

The procedure of Example 1 is repeated using $Re_2(CO)_{10}$ as the catalyst precursor with the exception that the reaction vessel is subjected to irradiation from the lamps for shorter periods of time. The results are shown in Table III, with molecular weights being determined by Gel Permeation Chromatography (GPC) using a polystyrene standard.

TABLE III

| Run # | Irradiation Time (min) | % PO Conversion | MW* | MN** | MW*/MN** |
|---|---|---|---|---|---|
| 1 | 35 | 22 | 21,874 | 11,338 | 1.929 |
| 2 | 40 | 26 | 29,773 | 14,333 | 2.077 |
| 3 | 45 | 90 | 2,286 | 1,527 | 1.497 |
| 4 | 60 | 90 | 2,388 | 1,505 | 1.586 |

*MW = Weight average molecular weight
**MN = Number average molecular weight

The results in Table III show that the molecular weight of the product can be varied according to the time of direct irradiation. Generally, as irradiation time increases, molecular weight increases up to a maximum then rapidly decreases and then increases slightly. The product of Run 2 is a viscous liquid with an inherent viscosity of 0.19. The product of Run 3 is a viscous yellow liquid with an inherent viscosity of 0.03.

EXAMPLE 3—NOT AN EMBODIMENT OF THE INVENTION

The procedure of Example 2 is repeated except that the reaction vessel is heated at 100° C. for 20 hours and is not subjected to irradiation of the lamps. No polymer is formed, therefore it may be concluded that photoinitiation is required for polymerization.

EXAMPLE 4

The procedure of Example 2 is repeated except that the irradiation time is 20 hours and the monoepoxide 3.2 g of styrene oxide. A product having an inherent viscosity of 0.06 is obtained in 66 percent conversion.

EXAMPLE 5

The procedure of Example 4 is repeated except that epichlorohydrin (3.55 g) is the monoepoxide. A product having an inherent viscosity of 0.07 is obtained in 58 percent conversion.

EXAMPLE 6

The procedure of Example 2 is repeated except that the source of irradiation is a Lumonics XeF laser having a wavelength of 350 nm. Further differences are that the contents of the reaction vessel are irradiated under focused conditions (15-inch focal length cylindrical lens) for periods of 60 minutes or less and are then allowed to stand in the dark for 20 hours. The results are shown in Table IV.

TABLE IV

| Run # | Irradiation Time (min) | $P_{AVG}$ (mJ/pulse) | Rep. Rate (HZ) | % PO Conversion | $\eta_{inh}$ |
|---|---|---|---|---|---|
| 1 | 10 | 50 | 0.3 | 11 | — |
| 2 | 25 | 49 | 5.0 | 96 | 0.114 |
| 3 | 60 | 37 | 10.0 | 100 | 0.132 |

Compared to runs using a conventional source of irradiation (see Table I), conversions using the laser are slightly higher. The inherent viscosities, however, are lower.

EXAMPLE 7

The procedure of Example 2 is repeated except that 2.5 g of n-butylene oxide is the monoepoxide. The results are shown in Table V.

EXAMPLES 8 AND 9

The procedure of Example 7 is repeated except that the reaction vessel is placed in the dark for 20 hours after the initial period of irradiation. The results are shown in Table V.

TABLE V

| Example # | Irradiation Time (min) | Dark Reaction (hr) | % Conversion* | $\eta_{inh}$ (dL/g) | MN** | MW** | MW/MN** |
|---|---|---|---|---|---|---|---|
| 7 | 40 | — | 92 | 0.05 | 1,493 | 3,684 | 2.47 |
| 8 | 10 | 20 | 84 | 0.10 | 2,552 | 13,800 | 5.41 |
| 9 | 15 | 20 | 80 | 0.11 | 2,700 | 14,248 | 5.28 |

*Based on product recovered
**Polystyrene Standard - Gel Permeation Chromatography

EXAMPLE 10

A 25 mm×25 mm×2 mm piece of transparent thirsty glass porous glass having a mass of 2 g is to be used as a supporting agent. The glass is pretreated by heating it to 500° C. under reduced pressure to remove residual water. A solution of 0.112 g of $Re_2(CO)_{10}$ in 10 ml of $CH_2Cl_2$ is prepared and then is thoroughly degassed by 3 freeze-pump-thaw cycles. The glass is then soaked in the solution for 11 days under an argon atmosphere.

The glass is then removed from the solution and is dried in a vacuum oven at a temperature less than 60° C. and a pressure of 40 mm of mercury. It is observed by weight differential methodology that 0.0012 g of $Re_2(CO)_{10}$ is absorbed on the glass.

An infrared spectrum taken of the glass shows a peak at 2075 $cm^{-1}$. After irradiation (450 watt Hanovia Hg Arc Lamp, pyrex filter, ~>300 mm) overnight under vacuum, infrared analysis shows that the original peak at 2075 $cm^{-1}$ disappears and a new peak at 2060 $cm^{-1}$ forms. These absorptions are consistent with a carbonyl bonded to rhenium. The glass is handled in the air during the infrared analysis.

After the preceding photolysis, the glass is placed in contact with 3 ml (2.49 g) of propylene oxide under an argon atmosphere for 6 days. After this time, unreacted propylene oxide is evaporated yielding 1.2 g (48 percent yield) of a viscous material with an inherent viscosity of 0.04 (25.1° C., $CH_2Cl_2$, [C]=0.5 g/dl).

EXAMPLE 11—NOT AN EMBODIMENT OF THE PRESENT INVENTION

A pyrex tube equipped with a high vacuum stopcock is charged with 0.01 g of $Re_2(CO)_{10}$, 0.4 g of silica gel (EM Reagents Silica Gel 60) and 7 ml of cyclohexane. The contents are then degassed by 4 freeze-pump-thaw cycles. The tube is then irradiated for 20 hours with a Hanovia 450 watt medium pressure Hg lamp. During the irradiation, the solution is stirred by a magnetic stirrer.

After the irradiation is complete, the cyclohexane is removed in vacuo and the solid catalyst is washed in a dry box (argon atmosphere) with cyclohexane to remove ay unsupported rhenium residues. After all the cyclohexane is removed, 3.32 g (4 ml) of degassed propylene oxide is added to the tube. After 6 days of stirring at room temperature, the reaction tube is removed from the dry box, the supported catalyst is filtered and unreacted propylene oxide is evaporated in vacuo. A yield of 0.03 g (0.9 percent) of a yellow viscous material is obtained. No product is obtained without initial irradiation.

EXAMPLE 12—NOT AN EMBODIMENT OF THE PRESENT INVENTION

A 25 mm×25 mm×2 mm piece of transparent Thirsty Glass porous glass having a mass of 2 g is placed in contact with 4 ml (3.32 g) of propylene oxide under an inert atmosphere for 6 days. A yield of 0.44 g (13 percent) of a viscous product is obtained. The inherent viscosity is found to be 0.02 ($CH_2Cl_2$, 25.1° C., [C]=0.5 g/dl). This illustrates that the glass itself has slight catalytic activity.

EXAMPLE 13—NOT AN EMBODIMENT OF THE PRESENT INVENTION

The procedure of Example 10 is repeated except that the glass is not irradiated. A yield of 0.51 g (20 percent) with an inherent viscosity of 0.02 is obtained.

As previously mentioned, the examples serve only to illustrate the invention and its advantages, and they should not be interpreted as limiting since further modifications of the disclosed invention will be apparent to those skilled in the art. All such modifications are deemed to be within the scope of the invention as defined by the following claims.

What is claimed is:

1. A process comprising polymerizing an alkylene oxide or mixture of alkylene oxides in the presence of a catalytic amount of at least one photoactivated species of a rhenium carbonyl coordination compound precursor and under reaction conditions, at a temperature of from 0° C. to 50° C., to form a liquid polyether having a weight average molecular weight of from about 2,000 to about 30,000.

2. A process as defined in claim 1 wherein said photoactivated species are formed by irradiating said precursor with electromagnetic radiation comprising a plurality of wavelengths from a range of about 200 nanometers to about 850 nanometers.

3. A process as defined in claim 2 wherein said precursor is dirhenium decacarbonyl.

4. A process as defined in claim 3 wherein said reaction conditions include a reaction environment that is substantially free of reaction inhibiting oxygen or water.

5. A process as defined in claim 4 wherein the alkylene oxide comprises ethylene oxide, propylene oxide, styrene oxide, allyl glycidyl ether, epibromohydrin, epichlorohydrin or a butylene oxide.

6. A process as defined in claim 5 wherein the reaction temperature is from about 20° C. to about 50° C.

7. A process as defined in claim 6 wherein the monoepoxide is propylene oxide or a butylene oxide.

8. A process as defined in claim 7 wherein the reaction temperature is from about 20° C. to about 30° C.

9. A process as defined in claim 8 wherein the monoepoxide is propylene oxide or n-butylene oxide.

10. The process of claim 3 wherein the precursor is supported on a transparent, porous glass supporting agent having an array of internal cavities.

11. The process of claim 10 wherein the supporting agent is thirsty glass porous glass.

12. A process of claim 1, 3, 4, 5 or 11 wherein the electromagnetic radiation comprises electromagnetic radiation having a laser as its source.

13. A process comprising polymerizing an alkylene oxide or mixture of alkylene oxides in the presence of a catalytic amount of at least one photoactivated species of a rhenium carbonyl coordination compound precursor and under reaction conditions to form a liquid polymeric polyether.

14. A process comprising polymerizing an alkylene oxide or mixture of alkylene oxides in the presence of a catalytic amount of at least one photoactivated species of a rhenium carbonyl coordination compound precursor and under reaction conditions to form a liquid polymeric polyether having a weight average molecular weight of from about 2,000 to about 30,000.

* * * * *